United States Patent [19]

Doherty, III et al.

[11] 3,979,592
[45] Sept. 7, 1976

[54] LARGE AREA RADIOGRAPHIC SCANNER

[75] Inventors: Edward J. Doherty, III, Halifax; David W. Morrison, Burlington, both of Mass.

[73] Assignee: Raytheon Company, Lexington, Mass.

[22] Filed: Apr. 17, 1975

[21] Appl. No.: 569,024

Related U.S. Application Data

[63] Continuation of Ser. No. 373,058, June 25, 1973, abandoned.

[52] U.S. Cl. ............................................. 250/363 S
[51] Int. Cl.$^2$ ............................................. G01T 1/16
[58] Field of Search ................ 250/363 S, 363, 366, 250/369, 327; 178/6.6 B, 6.7 R

[56] References Cited
UNITED STATES PATENTS

| | | | |
|---|---|---|---|
| 2,881,247 | 4/1959 | Levine et al. | 178/6.6 B |
| 3,590,148 | 6/1971 | Taudt et al. | 178/6.6 B |
| 3,735,132 | 5/1973 | Colombo et al. | 250/363 S |
| 3,839,641 | 10/1974 | Cooke et al. | 250/369 |

*Primary Examiner*—Davis L. Willis
*Attorney, Agent, or Firm*—David M. Warren; Joseph D. Pannone; Milton D. Bartlett

[57] ABSTRACT

A radiographic imaging system coupled to a movable table for repositioning subject matter at the conclusion of a scanning of an area of the subject matter. The imaging system is further coupled to a plural axis recording system in which a recording implement, such as a flashing light source, is driven in synchronism with a scanning motion of the imaging system along a recording medium such as a photographic film. Controller circuitry is coupled between the movable table, the imaging system and the recording system for synchronizing their respective operations and for selectably scaling the movement of a drive unit relative to the movement of the scanning. A large subject such as a complete human being may be scanned by repositioning the subject and the movable table at the conclusion of each of a sequence of area scans of the imaging system, and by scaling the output of the scanning system so that the successively scanned regions of the subject can be recorded upon a single standard size x-ray film plate.

5 Claims, 6 Drawing Figures

LARGE AREA RADIOGRAPHIC SCANNER

CROSS-REFERENCE TO RELATED CASES

This is a continuation of application Ser. No. 373,058, filed June 25, 1973 and now abandoned.

BACKGROUND OF THE INVENTION

Radiographic imaging systems, such as that disclosed in U.S. Pat. No. 3,735,132 which issued on May 22, 1973 to Sergio Colombo et al., are commonly employed to provide scintillation scans of an area of a subject such as the chest of a human being who has injested material having a radioactive isotope producing high energy radiation, such as gamma radiation, which is detected by the imaging system. The data received by the scanning operation may be recorded on paper with colored ink or an X-ray film plate by continually exposing points of the film plate to flashes of light which correspond to the intensisty of the scanned radiation. To cover a relatively large subject, such as a complete human being, several scannings are performed over each of a series of contiguous regions of the subject, with each of the scannings being recorded on a separate sheet of paper or X-ray plate.

A problem arises in that it is frequently desirable to show a scintillation recording of complete human being on a single X-ray plate of standard size rather than on a multiplicity of x-ray plates. This is particularly true in those situations wherein it is desired to store the recorded information on large subjects on a single x-ray plate of standard size. Such a reduction in size also facilitates the viewing of abnormalties in the bone structure of a human skeleton.

SUMMARY OF THE INVENTION

The aforementioned problems are overcome and other aspects of the invention are provided by a system which, in accordance with the invention, comprises a radiographic imaging system often referred to as a scanner, a movable table positioned adjacent to the scanner and having means for moving the table in synchronism with the motion of a radiation detector of the scanner, and a plural axis recording system having, in a preferred embodiment of the invention, a pair of drive units for driving a recording implement. The recording implement may be, by way of example, a flashing light source which is flashed by the radiographic scanner in accordance with the quantity of received radiation, while the recording medium may be, by way of example, a photographic plate responsive to the light flashes. Control circuitry is also provided for synchronizing the movement of the table with the movement of the radiation detector and for both scaling and synchronizing the movement of the recording implement with the movement of the radiation detector.

BRIEF DESCRIPTION OF THE DRAWINGS

The aforementioned features and other advantages of the invention are explained in the following description taken in connection with the accompanying drawings wherein.

DESCRIPTION OF THE PREFERRED EMBODIMENT

Figure 1:
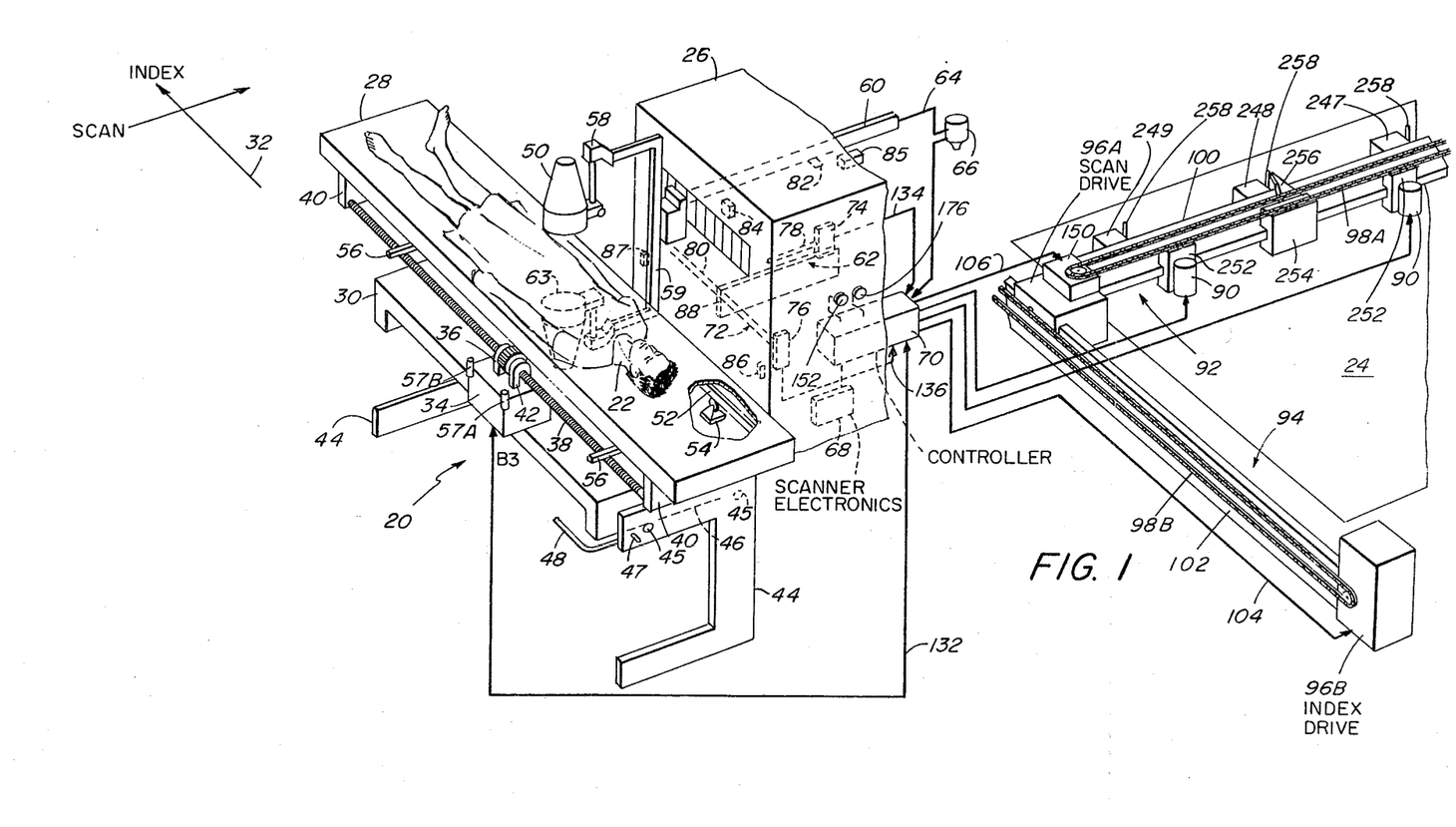
FIG. 1 is a pictorial view, partially in block diagram form, of the invention showing the movable table, a portion of a radiographic imaging system, and a plural axis recording system.

Referring now to FIG. 1, there is seen a radiographic scanning system 20 which provides, in accordance with the invention, for the scanning of a large area subject 22 such as human being while producing a reduced size recorded image of the subject 22 on a standard size recording medium such as a photographic plate 24. The radiographic scanning system 20 incorporates a radiographic imaging system of a well-known form, hereinafter referred to as a scanner 26, the scanner 26 being described in the aforementioned Pat. No. 3,735,132. The operation of the scanner 26 is unaltered by the radiographic scanning system 20 so that the scanner 26 is able to provide a recorded image of the subject 22 on recording medium such as a photographic plate and a paper record using colored inks for representing the intensities of radiations emanating from the subject 22, these recording mediums of the scanner 26 having been deleted in FIG. 1 to more readily show the novel features of the invention.

The subject 22 is supported by a table 28 which is movably positioned upon a base 30, movement being provided in the index and scan directions as is indicated by the coordinate axes 32. The table 28 is moved in the index direction by means of a drive unit 34 secured to the base 30 and driving through gear 36 to worm gear 38. The worm gear 38 is mounted at its ends via struts 40 to the table 28 and is urged in the index direction by rotation of the gear 36, the gear 36 being constrained to its position relative to the drive unit 34 by frame members 42. The base 30 is supported by a frame 44 which comprises roller assemblies 45 (or ball bearing units having recirculating raceways and known as linear ball bushings) which support rails 46 of the base 30, one such rail 46 and roller assembly 45 being shown at one end of the frame 44, it being understood that a rail 46 and roller assemblies 45 are similarly positioned at the opposite end of the frame 44. The rails 46 and roller assemblies 45 permit movement of the table 28 in the scan direction of the coordinate axes 32 for positioning the subject 22. A brake 47, which is actuated by an arm 48 of which a portion is seen in the figure, is provided for holding the table 28 fast from movement in the scan direction after the table 28 has been positioned beneath a radiation detector 50 of the scanner 26.

The table 28 includes a pair of rails 52 affixed lengthwise to the underside of the table 28 at both sides thereof, one such rail being seen through a cutaway portion of the table 28. The rails 52 are supported by a plurality of roller assemblies 54 which are similar to the roller assemblies 45 and are mounted on the base 30 to permit longitudinal motion of the table 28 in the index direction while preventing any movement of the table 28 in the transverse or scan direction. The table 28 also includes a pair of mechanical stops 56 which are positioned for signaling the drive unit 34 when an extreme position of the table 28 has been reached, the mechanical stops 56 contacting electrical switches 57A and 57B for deenergizing the drive unit 34.

The radiation detector assembly 50 of the scanner 26 is secured by means of a height adjustment member 58 through the end of a strut 59 at the end of a boom 60 which is driven in the scan direction by a mechanical drive assembly 62, a portion of which appears in the figure. A second radiation detector assembly 63 is affixed to the lower end of the strut 59 for scanning the underside of the subject 22. The boom 60 is mechanically coupled, indicated diagrammatically via line 64 in the figure, to a lamp 66 which directs flashes of light upon a photographic plate, not shown in the figure, for recording the presence of quanta of raidiant energy impinging upon the radiation detector assembly 50. The lamp 66 is energized by signals generated by an electronics unit 68 of the scanner 26 in response to detections of the quanta of radiant energy, these signals being passed via controller 70, to be described in FIG. 3, to the lamp 66.

The scanner 26 also comprises a mechanical drive assembly 72, partially shown in the figure, for positioning the boom 60 in the index direction. The mechanical drive assemblies 62 and 72 include drive units 74 and 76 for urging the boom 60 respectively in the scan direction and the index direction. The drive units 74 and 76 operate in a manner similar to that of the drive unit 34 and impart motion to the boom 60 via worm gears 78 and 80. A mechanical stop 82 mounted on the boom 60 actuates switches 84 and 85 for designating extreme positions of the boom 60, the switches 84 and 85 providing signals, as will be shown in FIG. 3, for energizing the drive unit 74 to reverse the direction of drive along the scan axis. A similar set of switches 86 and 87 is mounted for contacting member 88 to designate extreme positions of the indexing motion of the boom 60 as the member 88 is driven along the index axis by the worm gear 80. The interconnection of the switches 86 and 87 in circuitry energizing the drive unit 76 will be seen in FIG. 3.

The radiographic scanning system 20 is also seen to comprise a pair of lamps 90 which are coupled electrically by the controller 70 to the circuitry which energizes the lamp 66 and similar circuitry and lamps (not shown) coupling signals from the lower detector assembly 63. Thus, the lamps 90 also flash in accordance with the occurrences of the quanta of radiant energy at the radiation detector assemblies 50 and 63. The lamps 90 are positioned by scan and index drive assemblies 92 and 94, each of which is seen to comprise respectively drive units 96A-B which drive through chains 98A-B. The chain 98B is coupled to the scan drive unit 96A which is affixed to one end of a member 100 for sliding the member 100 along rails 102 which are positioned at opposite ends of the member 100, one of these rails 102 being shown in the figure. The chain 98A is coupled to the lamps 90 for moving the lamps 90 along the member 100 in the scan direction. Thus, it is seen that the chain 98B moves the member 100 and the lamps 90 in the index direction in accordance with signals provided by the controller 70 along line 104 to the drive unit 96B, while the chain 98A scans the lamps 90 in accordance with signals provided by the controller 70 along line 106 to the drive unit 96A.

The signals provided along the lines 104 and 106, as will be described hereinafter, can be scaled to provide movement of the lamps 90 extending over only a portion of the photographic plate 24 while the scanner 26 completes a scan of the subject 22 through the extreme positions of index and scan. This complete scan by the scanner 26 will sometimes be referred to hereinafter as a frame. At the conclusion of such scanning by the scanner 26, the boom 60 is indexed to its initial position along the index axis and, concurrently therewith, the table 28 is translated an identical displacement in the index direction so that a subsequent scanning by the scanner 26 covers another portion of the subject 22 contiguous to the previous portion scanned.

Figure 2:
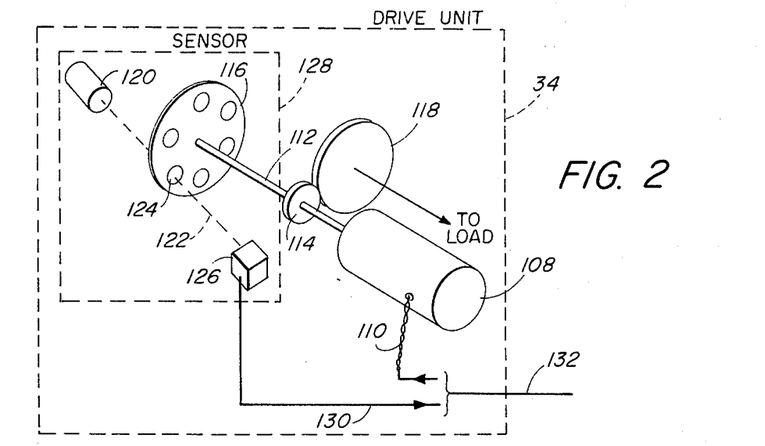
FIG. 2 is a diagram of a drive unit including a sensor of angular motion utilized in the movable table and in the radiographic imaging system of FIG. 1.

Referring now to FIG. 2, there is shown a diagram of the drive unit 34, this figure also serving to describe the drive units 74 and 76 which are similar to the drive unit 34. The drive unit 34 comprises a motor 108 which is energized by wires 110, a shaft 112 for coupling the motor 108 to a pinion 114 and reticle 116, a gear 118 meshed to the pinion 114, and a lamp 120 which casts a beam of light 122 through apertures 124 of the reticle 116 to a photodetector 126. The motor 108 drives the load by rotating the shaft 112 which, in turn, imparts this rotation through the pinion 114 and the gear 118 to the load. As shown in FIG. 1, this load is the gear 36 and the worm gear 38 which drives the table 28. With respect to the drive units 74 and 76, their loads are respectively worm gears 78 and 80 which drive the boom 60.

The reticle 116, the lamp 120 and the photodetector 126 are seen to comprise a sensor 128 which provides a sequence of electrical pulses on line 130. The electrical pulses on line 130 are provided by the photodetector 126 in response to pulsations of the light beam 122 which are produced by the rotating reticle 116 as its apertures 124 momentarily pass light along the light beam 122. Each pulse of light on the light beam 122 represents an increment of rotation of the recticle 116 and the shaft 112. Accordingly, each electrical pulse on line 130 represents an increment of rotation. Sensors such as the sensor 128 are also provided in the drive units 74 and 76 to provide data with respect to the amount of rotations of the worm gears 78 and 80, and hence, the position of the boom 60.

Referring to FIGS. 1 and 2, the wires 110 and the line 130 are seen to be coupled diagrammatically via line 132 to the controller 70. The sensor and motor of the drive units 74 and 76 are similarly coupled to the controller 70 via lines 134 and 136. The interconnections of the drive unit 34, the drive unit 74 and the drive unit 76 with the controller 70 will be described with reference to FIG. 3.

Figure 3:
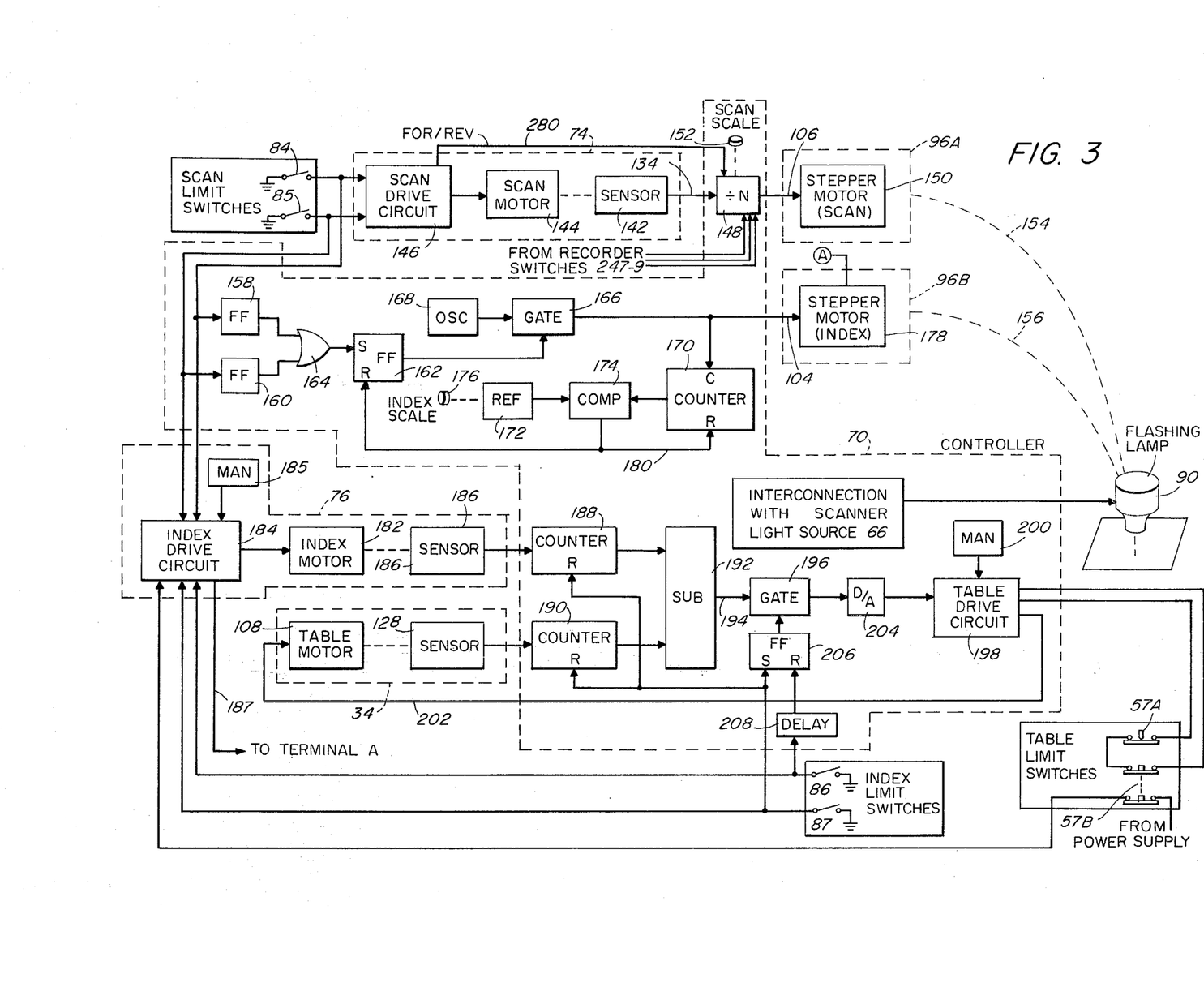
FIG. 3 is a block diagram of a controller of FIG. 1 shown coupled to the movable table, the imaging system and the plural axis recording system of FIG. 1 for coordinating their operation.

Referring now to FIG. 3, there is seen a block diagram of the controller 70. The controller 70 is responsive to the scan switches 84 and 85 for providing signals along line 106 to energize the scan drive unit 96A and along line 104 to energize the index drive unit 96B. The controller 70 is further responsive to signals from the switches 86 and 87 and the switches 57A.B for energizing the table drive unit 34.

The switches 84 and 85 are coupled to the drive unit 74 which comprises a sensor 142 and a motor 144, similar to the sensor and motor of the drive unit 34, and further comprises a drive circuit 146 for providing forward and reverse drive signals to the motor 144 in accordance with activation of the switches respectively 84 and 85. The output electrical pulses from the sensor 142 are passed via line 134 to a divider 148 of the controller 70 which, in turn, provides a sequence of electrical pulses on line 106 to a stepper motor 150 of the drive unit 96A. The divider 148 may comprise, for example, a counter which counts modulo N and then provides an output pulse on line 104 each time a count of N is reached. The divider 148 comprises additional circuitry for adjusting the alignment of the lamps 90 as will be described with reference to FIG. 6. The value of the number N is set by means of knob 152 which is coupled to the electrical circuitry utilized with the counter, the value of N being typically set to 2 or 5 so that the divider 148 provides a scale factor of one-half or one-fifth for the driving of the stepper motor 150. In this way the scanning movement of the lamps 90 is equal to one-half or one-fifth the scanning movement of the boom 60 of FIG. 1. The mechanical connection (shown in FIG. 1) between the drive unit 96A and the lamps 90 is indicated diagrammatically by line 154 in FIG. 3 while the mechanical connection between the drive unit 96B and the lamp 90 is similarly indicated by the line 156.

The operation of the index drive unit 96B is accomplished with the aid of two flip-flops 158 and 160 coupled respectively to the switches 84 and 85, a flip-flop 162, an OR gate 164 coupling the outputs of the flip-flops 158 and 160 to the set terminal of the flip-flop 162, a gate 166 which is set by the flip-flop 162, an oscillator 168 which applies clock pulses to the gate 166, a counter 170 which counts clock pulses of the oscillator 168 which are passed by the gate 166, a reference 172 and a comparator 174 coupled between the reference 172 and the counter 170. The reference 172 is typically an encoder set by a knob 176 to provide a digital number which the comparator 174 compares with the digital number representing the count of the counter 170.

Upon each reversal of the boom 60 in its movement along the scan axis, as was shown in FIG. 1, the scan limit switches 84 and 85 energize either flip-flop 158 or 160 which, in turn, via OR gate 164 set the flip-flop 162 to open the gate 166 thereby passing pulses from the oscillator 168 to a stepper motor 178 of the indexing drive unit 96B. As is well known, a stepper motor rotates only a fixed angular increment for each pulse applied at its input with the result that the stepper motor 178 rotates an amount precisely proportional to the number of pulses of the oscillator 168 which are passed by the gate 166. The number of these pulses and, hence, the amount of distance traveled by a lamp 90 during the indexing operation is controlled by the counter 170 and the comparator 174. The counter 170 counts the number of pulses being supplied to the stepper motor 178 by the gate 166, and the comparator 174 provides a signal on line 180 when the count of the counter 170 equals the preset value of the reference 172; the signal on line 180 resets the flip-flop 162 and the counter 170 thereby terminating the flow of pulses through the gate 166 and terminating the indexing operation while resetting the counter 170 to prepare it for the counting of the next indexing operation.

The drive unit 76 is seen to comprise a motor 182 for indexing the boom 60 of FIG. 1, a drive circuit 184 with a manually operable switch 185 coupled thereto for energizing the motor 182, and a sensor 186 mechanically coupled to the motor 182. The drive circuit 184 also provides a signal on line 187 to terminal A of the stepper motor 178 which causes the rotation of the stepper motor 178 to be in a forward or reverse direction in accordance with the rotation of the index motor 182. The controller 70 is seen to further comprise a counter 188 for counting electrical pulses provided by the sensor 186, a counter 190 for counting electrical pulses provided by the sensor 128, and a subtractor 192 coupled to the counters 188 and 190 for providing the difference between the count of the counter 188 and the count of the counter 190, this difference appearing on line 194. The difference signal on line 194 is proportional to the difference in the number of pulses provided by the sensors 186 and 128 and, accordingly, represents the difference in rotation of the index motor 182 and the table motor 108 and the difference between the amount of travel experienced by the detector assembly 50 and the table 28 during the indexing operation. The difference signal on line 194 is utilized to drive the table motor 108 in the following manner.

The controller 70 further comprises a gate 196 coupled to the line 194, a drive circuit 198 having a manually operable switch 200 coupled thereto for energizing via line 202 the motor 108, a digital-to-analog converter hereinafter referred to as converter 204 coupled between the gate 196 and the drive circuit 198, a flip-flop 206 and a delay unit 208. The difference signal on line 194 is passed via the gate 196 to the converter 204 which converts the signal from a digital number to an analog voltage having an amplitude proportional to the magnitude of the digital number. The drive circuit 198 provides an electrical signal on line 202 having an amplitude in accordance with the amplitude of the signal of the converter 204 so that the motor 108 is made to rotate when a non-zero signal appears from the converter 204 and stops rotating when the signal of the converter 204 drops to zero. In the event that the converter 204 provides a negative signal as would occur when the count of the counter 190 exceeds the count of the counter 188, then the drive circuit 198 drives the motor 108 in the reverse direction. In this way the movement of the detector assembly 50 and the movement of the table 28 are synchronized.

The gate 196 is operated in response to signals provided by the index limit switches 86 and 87. The index drive circuit 184 is responsive to signals provided by the scan limit switches 84 and 85 as well as to the signals provided by the index limit switches 86 and 87. At the conclusion of each scanning movement of the boom 60 of FIG. 1 as is indicated by the operation of either switch 84 or 85 (indicated in FIG. 3, by way of example, as a grounding of the line connecting from the switch to the drive circuit 184) the drive circuit 184 indexes the boom 60 incrementally between the successive scans of the boom 60, and then at the conclusion of one complete frame of the scanning procedure, the drive circuit 184 energizes the motor 182 to reposition the boom 60 along the index axis at the starting position for a new frame. The extreme positions of an individual frame are indicated by the limit switches 86 and 87 so that upon the completion of a frame the limit switch 87 signals the index drive circuit 184 to drive the boom 60 back to the starting position, the starting position being indicated by the closure of the switch 86 at which time the drive circuit 184 discontinues energizing the motor 182. During the incremental motion of indexing between the successive scans of the boom 60, neither the switch 86 nor the switch 87 is energized the drive circuit 184. In addition, it is noted that the switch 87 is coupled to the set terminal of the flip-flop 206 and to the reset terminals of both the counters 188 and 190 while the limit switch 86 is coupled by the delay unit 208 to the reset terminal of the flip-flop 206. Thus, during the aforesaid incremental indexing of the boom 60, no signals are transmitted by the limit switches 86 and 87 to the counters 188 and 190 and the flip-flop 206. Thus, it is seen that during the incremental indexing, the gate 196 remains closed so that no signal passes from the line 194 to the converter 204 and the table drive circuit 198 with the result that the table 28 of FIG. 1 remains stationary during this incremental indexing period.

The closing of the limit switch 87 at the conclusion of a frame of the scanning results in the driving of the index motor 182, the setting of the flip-flop 206 which, in turn, opens the gate 196 to pass the signal from line 194, and resets the counters 188 and 190 so that they may begin counting the pulses which are produced by the sensors 186 and 128 upon the rotations of the index motor 182 and the table motor 108. At the conclusion of the indexing of the boom 60 when the boom 60 reaches its starting position, the limit switch 86 closes to stop the rotation of the index motor 182 and to reset the flip-flop 206 to terminate the flow of signals from the line 194 to the converter 204. The delay unit 208 delays the resetting of the flip-flop 206 for a sufficient period of time to permit the table motor 108 to rotate to a position which provides a difference of zero on line 194; thus, the flip-flop 206 is reset after the table 28 of FIG. 1 and the boom 60 have become realigned to the start position of the next frame of scanning. In this way, the table 28 remains stationary as the boom 60 and detector assembly 50 are indexed incrementally between the successive scanning movements along the scan axis of the coordinate axes 32, with the table being shifted in position along the index axis as the detector assembly 50 is repositioned along the index axis at the conclusion of each scanning frame. The index drive circuit 184 is set, preferably, to provide three consecutive scanning frames whereupon, the scanning is terminated.

The manually operable switches 185 and 200 permit manual operation of the indexing motor 182 and the table motor 108. The table limit switches 57A and 57B are operated whenever the table 28 reaches one or the other of its extreme positions for deenergizing the drive circuit 198 to prevent further travel of the table 28. In addition, the switch 57B is provided with a set of terminals for disconnecting the power from an external power supply (not shown in the drawings) to the drive circuit 184 thereby terminating the program of the successive indexings of the detector assembly 50 when the table 28 has reached an extreme position.

Figure 4:
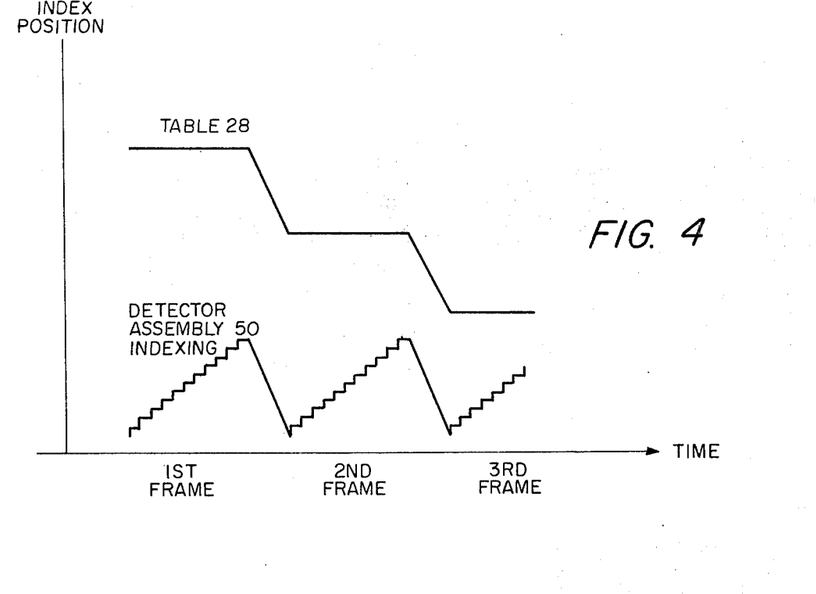
FIG. 4 is a timing diagram showing the movement of the table of FIG. 1 in the indexing of the scanning mechanism of the imaging system of FIG. 1.

Referring now to FIG. 4, there is shown a timing diagram which portrays the position of the table 28 and the detector assembly 50. Position is shown on the vertical axis and time is shown on the horizontal axis. The table 28 is seen to be initially stationary as the detector assembly 50 is indexed incrementally between successive ones of the scannings along the scan axis. At the conclusion of the first frame the detector assembly 50 is brought back to its starting position while the table 28 is displaced by an equal amount. Thereafter the incremental indexing of the detector assembly 50 is repeated while the table 28 remains stationary and, at the conclusion of the second frame, the table 28 is displaced by a distance equal to that of the indexing of the detector assembly 50 whereupon the scanning of the third frame is initiated.

Figure 5:
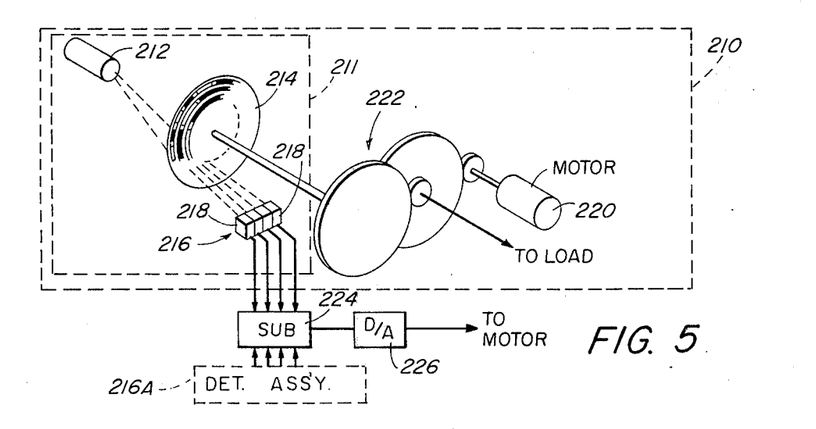
FIG. 5 is an alternative embodiment of the sensor of FIG. 2 and shows control circuitry for coordinating the motion of the table and the motion of the scanner of the imaging system.

Referring now to FIG. 5, there is shown an alternative embodiment of a drive unit, such as a drive unit 34, herein designated by the label 210. The drive unit 210 includes a sensor 211 which is seen to comprise a lamp 212, an encoding disk 214 of a well-known form having alternating regions of opacity and transparency of which the outermost regions are relatively small to provide fine resolution and angle while the inner regions grow progressively larger in size to provide the more significant digits of a digital number representing the angle, and a detector assembly 216 having a plurality of detector elements 218 positioned for detecting light from the lamp 212 which passes through the various rings of transparent regions of the encoding disk 214. The drive unit 210 further comprises a motor 220 and a gear train 222 for coupling rotation of the motor 220 to the encoding disk 214 and to a load such as the table 28 or boom 60 of FIG. 1.

Suitable signals for driving a motor such as the table motor 108 of FIGS. 2 and 3 are provided by means of a subtractor 224 which subtracts the digital number obtained from the detector assembly 216 from the appearing, for example, at a similar detector assembly indicated by the legend 216A which would be a part of another drive unit 220 utilized for indicating the position of, for example, the boom 60 of FIG. 1. The output of the subtractor 224 is coupled by a converter 226 which converts the digital number of the subtractor 224 to an analog electrical signal having an amplitude proportional to the digital number, this electrical signal being suitable for the driving of a motor such as the table motor 108 of FIGS. 2 and 3. The drive unit 210 is useful in that it avoids the possibility of a missing count or an extra count being registered by the counters 188 and 190 of FIG. 3 for insuring that the table 28 and the detector assembly 50 of FIG. 1 are properly aligned.

Figure 6:
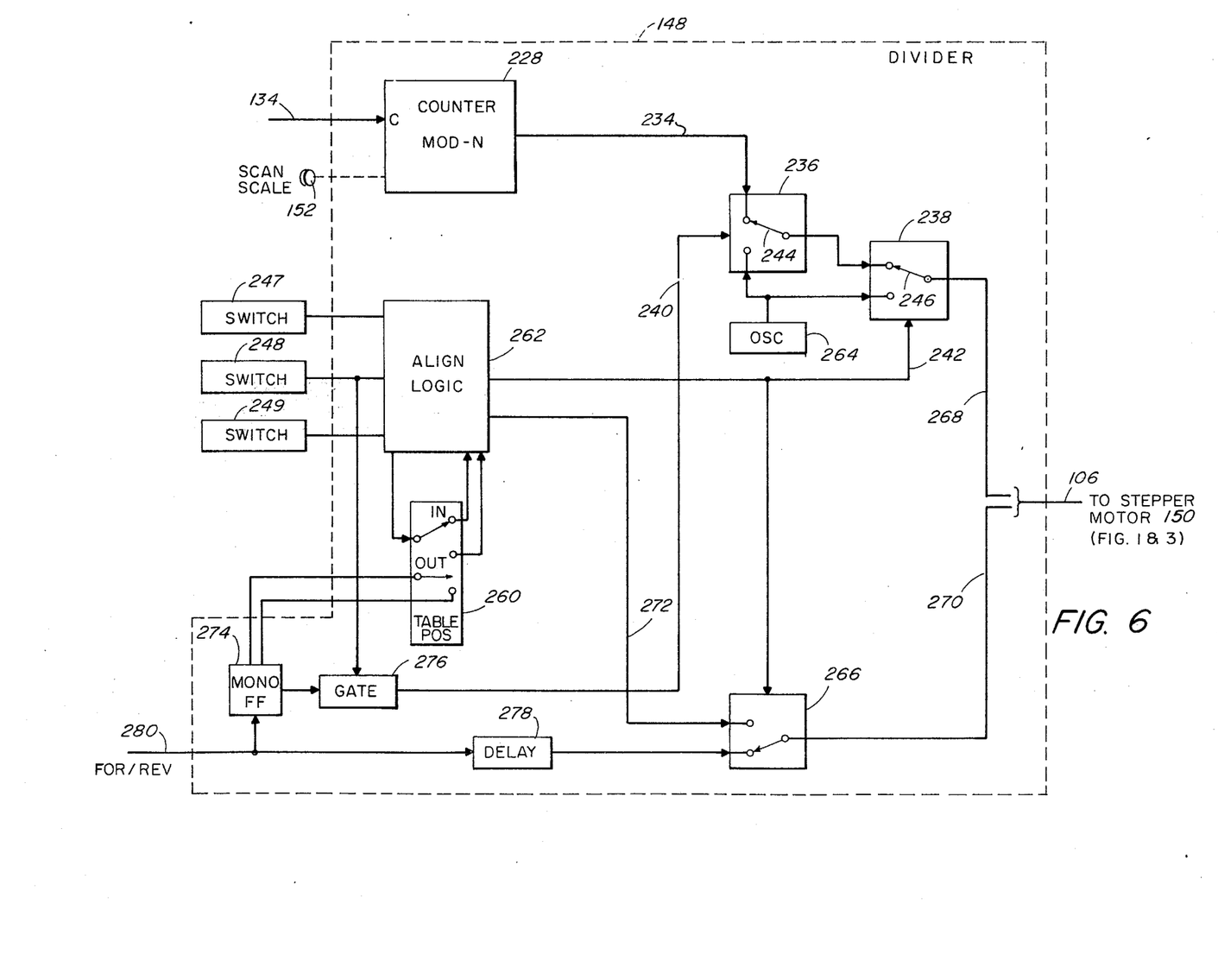
FIG. 6 shows circuitry within a divider of FIG. 3 for adjusting the position of a recording implement of FIG. 1.

Referring now to FIG. 6, there is shown a block diagram of the divider 148 which is seen to comprise a counter 228 which counts the pulse signals appearing on line 134, seen also in FIG. 3, provided by the sensor 142 of FIG. 3. The counter 228 counts modulo-N and provides a pulse on line 234 at each count of N, the number N being selected by the knob 152. The pulse signals on line 234 occur at a rate equal to, for example, one-half or one-fifth the rate of the pulses arriving on line 134 to provide the scaling function previously described with reference to FIG. 3.

The divider 148 further comprises two switches 236 and 238 which are activated in response to signals provided by respectively lines 240 and 242. For example, the switches 236 and 238 may be fabricated from an electronic gates or by the use of high speed relays. The switches 236 nad 238 are shown with their contactors 244 and 246, respectively, in the deactivated or deenergized position. The pulse signals on line 234 are coupled via the switches 236 and 238 in their deactivated positions to the line 106, seen also in FIG. 3, for the coupling of this signal to the stepper motor 150 of FIG. 3.

While the signals on the line 106 have a repetition frequency which is a fixed fraction of the repetition frequency of the signals on line 134, this is to ensure accurate tracking of the lamps 90 of FIG. 1 relative to the movement of the detector assembly 50 of FIG. 1, it has been found desirable to provide the divider 148 with the additional capability of providing an additional number of pulse signals on line 106 for realigning the lamps 90 with the position of the detector assembly 50 at a terminus of each scan of the detector assembly 50. This alignment function is provided with the aid of switches 247, 248 and 249 which are seen in FIGS. 1 and 6 and referred to in FIG. 3. As seen in FIG. 1, the lamps 90 are coupled to the chain 98A by guides 252 which slide along the member 100. Between the two guides 252 is a guide 254 which similarly slides along the member 100 and is coupled to the chain 98A, and is furthermore provided with a tang 256 for contacting levers 258 of the switches 247-249.

Prior to the scanning by the scanner 26 of FIG. 1, a switch 260 of the divider 148 in FIG. 6 is placed in either the IN or the OUT position in accordance with the position of the table 28 as being either IN, namely, close to the scanner 26, or OUT, being away from the scanner 26, this positioning of the table 28 in the scanning direction having been described previously with respect to FIG. 1. The divider 148 further comprises an alignment logic unit 262, an oscillator 264, and a switch 266 which is similar to the switch 238 and is similarly energized by a signal on line 242. The output of the switch 238 on line 268 and the output of the switch 266 on line 270 are both shown as being coupled via the line 106 to the stepper motor 150 of FIGS. 1 and 3. In response to the operation of the switch 260, the alignment logic unit 262 provides a signal on line 242 for activating the switches 238 and 266 for coupling pulse signals of the oscillator 264 along line 268 to the stepper motor 150 and for coupling a signal along line 272 from the alignment logic unit 262 to the stepper motor 150 via line 270. The pulse signals of the oscillator 264 impart rotation to the stepper motor 150. The signal on line 272 from the alignment logic unit 262 provides that this rotation be in a positive or negative sense.

In operation, therefore, upon activation of the alignment logic unit 262 by the switch 260, the alignment logic unit 262 provides for a rotation of the stepper motor 150 to drive the guide 254 towards the switch 247 and then back to the switch 248, or towards the switch 249 and back to the switch 248 depending on whether the IN position or the OUT position of the switch 260 has been utilized. In response to signals received from the switches 247–249, the alignment unit 262 provides the signals on lines 272 and 242 to establish the aforementioned movement of the guide 254 so that the guide 254 terminates its initial alignment by contacting the lever 258 of the switch 248 on an outgoing stroke or on an ingoing stroke, respectively, in the event that the switch 260 is in the IN position or OUT position.

Referring now to FIGS. 1, 3 and 6, the divider 148 further comprises a monostable flip-flop 274, a gate 276, and a delay unit 278. The scan drive circuit 146 provides on line 280 a digital signal having a logic state of 1 when the scan motor 144 is energized to rotate in one direction and a logic state of 0 when the scan motor 144 is energized to rotate in the opposite direction. The logic state of the signal on line 280 reverses the moment that the scan motor 144 is deenergized as occurs upon the completion of each scan line of scanning by the detector assembly 50; accordingly, the reversal of logic state indicates the instant of completion of a scan line. The signal on line 280 is coupled to the divider 148 wherein it is utilized for triggering the flip-flop 274 and is also passed via the delay unit 278 and the switch 266 in its deenergized position to the stepper motor 150.

During the scanning operation by the scanner 26, the lamps 90 are aligned at the completion of each round trip in the scan direction of the detector assembly 50, the alignment being accomplished by bringing the tang 256 to the lever 258 of the switch 248 in the following manner. The flip-flop 274 is coupled to a contactor of the switch 260 which, in cooperation with well-known circuitry within the flip-flop 274, provides that the flip-flop 274 is triggered on the leading edge of the waveform of the signal on line 280 during one position of the switch 260 while the flip-flop 274 is triggered on the trailing edge of the wave-form on line 280 when the switch 260 is in the opposite position. In this way, the flip-flop 274 is triggered at substantially the same instant when the tang 256 actuates the switch 248 irrespectively of whether the tang is traveling between the switches 247 and 248 corresponding to the IN position of the table 28, or traveling between the switches 249 and 248 which corresponds to the OUT position of the table 28.

The gate 276 is normally open for passing a signal from the output of the flip-flop 274 to the switch 236, but is closed by the switch 248 while the switch 248 is actuated by the tang 256. A lack of alignment is corrected as follows. Upon being triggered, the flip-flop 274 momentarily applies a signal via the gate 276 and line 240 which momentarily activates the switch 236 for an interval of time which is shorter than the interval during which the incremental indexing of the detector assembly 50 occurs. Upon activation of the switch 236, pulse signals from the oscillator 264 are coupled via the contactor 244 of the switch 236 and via the switch 238 in its deenergized state to the stepper motor 150 for further rotation of the stepper motor 150 at a time subsequent to the cessation of pulses on line 134. The proper rotation of the stepper motor 150 during this short interval of time is provided for by the delay unit 278 which communicates the signal which had been present on line 280 via the switch 266 to the stepper motor 150.

The delay unit 278 does not influence the direction of rotation of the stepper motor 150 during a subsequent line scan since this delay is shorter than the indexing interval between the successive line scans. The delay of the delay unit 278 is longer than the duration of the signal provided on line 240 by the flip-flop 274 to ensure that rotation of the stepper motor 150 is stopped before the termination of the signal on line 270 indicating the direction of rotation. This relationship can be ensured, by way of example, by utilizing a type D flip-flop (not shown) in the delay unit 278 in which case the signal on line 280 would be applied to the D input while the trailing edge of the output of the flip-flop 274 would be utilized to clock the type D flip-flop with the result that the signal on line 270 resets itself.

The succession of pulses provided by the contactor 244 and the oscillator 264 is terminated by either the resetting of the flip-flop 274 which deactivates the switch 236, or by the action of the switch 248 in closing the gate 276 thereby deenergizing the switch 236. It is recalled that the tang 256 activates the switch 248 when the guide 254 is aligned in the proper position for beginning the next scan and, accordingly, the closing of the gate 276 by the switch 248 terminates rotation of the stepper motor 150 when the guide 254 is aligned.

It is understood that the above-described embodiments of the invention are illustrative only and that modifications thereof will occur to those skilled in the art. Accordingly, it is desired that this invention is not to be limited to the embodiments disclosed herein but is to be limited only as defined by the appended claims.

What is claimed is:

1. A radiographic display system comprising:
   a radiation detector assembly;
   means for scanning said radiation detector assembly in a prescribed format which includes a scanning along a first axis and a scanning along a second axis normal thereto, said detector scanning means comprising means for sensing the position of said detector;
   means for supporting a subject emitting radiation spaced from said radiation detector assembly;
   means coupled to said radiation detector assembly for producing an image, said image producing means comprising recording means and means for scanning said recording means;
   means coupled between said detector scanning means and said image producing means for signaling said image producing means to scan in a format similar to said format of said detector scanning, said signaling means including means for altering the relative sizes of said detector scanning format and said image scanning format; and
   means for positioning said subject support means concurrently with a portion of a scanning of said detector scan format, said support positioning means comprising means for sensing the position of said subject support and means responsive to each of said sensing means for positioning said support.

2. A system according to claim 1 wherein said signaling means includes means coupled to said detector scanning means for generating a sequence of pulses for operating said recorder scanning means.

3. A system according to claim 2, wherein said recorder scanning means includes means coupled to said signaling means for realigning said recording means at the beginning of each of said scannings along said first axis.

4. A system according to claim 3 wherein said realignment is done concurrently with a scanning along said second axis.

5. A radiographic display system comprising:
   a radiation detector assembly;
   means for supporting a subject emitting radiation spaced from said radiation detector assembly, said radiation detector assembly including means for viewing a subject from a first direction and from a second direction;
   means coupled between said detector assembly and said supporting means for imparting a relative motion between said detector assembly and said subject, said relative motion following a prescribed scan format;
   means coupled to said radiation detector assembly for producing an image, said image producing means comprising display means and means for scanning said display means;
   means coupled between said relative motion means and said image producing means for signaling said image producing means to scan format, similar to said format of said relative motion scan format, said signaling means including means for altering the relative sizes of said relative motion scan format and said image scan format; and
   means for positioning said subject support means concurrently with a portion of said relative motion between said detector assembly and said subject.

* * * * *

UNITED STATES PATENT OFFICE
CERTIFICATE OF CORRECTION

Patent No. 3,979,592  Dated September 7, 1976

Inventor(s) Edward J. Doherty, III et al.

It is certified that error appears in the above-identified patent and that said Letters Patent are hereby corrected as shown below:

Column 7, line 3, "energized" should read -- energizing --

Column 8, line 28, "the", second occurrence, should read -- that --

Column 8, line 31, "220" should read -- 210 --

Column 10, line 61, after "270" insert -- would change its logic state immediately after the flip-flop 274 --.

Signed and Sealed this

Eighth Day of March 1977

[SEAL]

Attest:

RUTH C. MASON
*Attesting Officer*

C. MARSHALL DANN
*Commissioner of Patents and Trademarks*